(12) United States Patent
Kim et al.

(10) Patent No.: US 12,045,753 B2
(45) Date of Patent: Jul. 23, 2024

(54) SYSTEM FOR DETECTING ACCIDENT RISK IN WORKING PLACE

(71) Applicant: CORNERS CO., LTD, Seoul (KR)

(72) Inventors: Dong Oh Kim, Seoul (KR); Jang Won Choi, Seoul (KR)

(73) Assignee: CORNERS CO., LTD., Seoul (KR)

( * ) Notice: Subject to any disclaimer, the term of this patent is extended or adjusted under 35 U.S.C. 154(b) by 106 days.

(21) Appl. No.: 17/955,723

(22) Filed: Sep. 29, 2022

(65) Prior Publication Data

US 2024/0005247 A1    Jan. 4, 2024

(30) Foreign Application Priority Data

Jul. 1, 2022  (KR) .......................... 10-2022-0081393

(51) Int. Cl.
| | |
|---|---|
| G06Q 10/0635 | (2023.01) |
| G06T 7/00 | (2017.01) |
| G06T 7/70 | (2017.01) |
| G06T 17/00 | (2006.01) |
| G06V 20/52 | (2022.01) |
| G08B 21/02 | (2006.01) |
| H04N 7/18 | (2006.01) |

(52) U.S. Cl.
CPC ....... *G06Q 10/0635* (2013.01); *G06T 7/0002* (2013.01); *G06T 7/70* (2017.01); *G06T 17/00* (2013.01); *G06V 20/52* (2022.01); *G08B 21/02* (2013.01); *G06T 2207/30232* (2013.01); *G06T 2207/30242* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 2018/0204335 A1* | 7/2018 | Agata | H04N 23/62 |
| 2018/0343421 A1* | 11/2018 | Kahle | G01C 11/06 |
| 2020/0050901 A1* | 2/2020 | Kirchner | G06V 10/7788 |
| 2021/0042940 A1* | 2/2021 | Mitra | H04N 5/268 |
| 2021/0201584 A1* | 7/2021 | Ha | G06V 10/80 |
| 2023/0081003 A1* | 3/2023 | Hammes | H04N 7/183 |
| | | | 700/255 |
| 2023/0113406 A1* | 4/2023 | Mori | G06V 10/25 |
| | | | 382/181 |

\* cited by examiner

*Primary Examiner* — Edward Martello
(74) *Attorney, Agent, or Firm* — WHDA, LLP

(57) ABSTRACT

A system for detecting an accident risk in a working place that can determine a work stage of the working place where various kinds of works, such as a cargo loading and unloading workshop, are performed or determine whether or not there is a risk that an accident may occurs in the working place is disclosed. In the disclosed system for detecting the accident risk in the working place, a camera is used to photograph the working place, only information about an object recognized by analyzing the image is transmitted to the server without transmitting the photographed image to the server, thereby minimizing an amount of information transmitted from the camera to the server.

17 Claims, 6 Drawing Sheets

(a)

(b)

(a) (b) (c) (d) (e) (f) (g)

(a) (b) (c) (d) (e) (f)

(a)

(b)

(a)

(b)

SYSTEM FOR DETECTING ACCIDENT RISK IN WORKING PLACE

CROSS-REFERENCE TO RELATED APPLICATION

This application claims priority to Korean Patent Application No. 10-2022-0081393 filed on Jul. 1, 2022 and all the benefits accruing therefrom under U.S.C. § 119, the contents of which are incorporated by reference in their entirety.

BACKGROUND

1. Field of the Invention

The following embodiments relate to a system for detecting an accident risk occurring in a working place, and more particularly, to a system for reproducing a situation of the working place in a virtual space by analyzing a real-time photographed image of the working place and determining a work stage of the working place or whether or not an accident and risk have occurred at the corresponding work stage based on the reproduced situation.

2. Description of Related Art

Due to the recent manpower shortage and increase in labor costs, many work in the working place are mechanized and automated. As a result, the number of manpower required for work has decreased, but since it is not possible to automate all fields, workers in the working place are performing their work by being mixed with equipment required for automation.

Therefore, the risk that is likely to cause accidents such as collision between a worker and equipment, a worker being caught between equipment, and fall of a worker from equipment, etc. is increasing depending on the progress of work, etc. In order to prevent the accidents, technologies for placing a camera that photographs the working place, analyzing the photographed image to respond quickly at an early stage in the event of occurrence of the accident, or generating a warning message when a risky situation that may cause the accident has occurred are being developed.

However, in the prior art, there are many cases where an image photographed using the camera is received as it is and analyzed by a server. In this case, excessive data is transmitted from the camera to the server, and the server consumes excessive CPU or GPU resources for image processing, and thus, there are cases in which images received from multiple cameras cannot be analyzed.

In addition, in the prior art, since a two-dimensional image photographed using the camera is just analyzed as it is, it is easy to detect a change in state of a specific detection target, but has a limit in detecting a risky situation that occurs in a complex way in a three-dimensional work space, such as changes in position, distance, and height of various detection targets.

SUMMARY

The following embodiments of the present disclosure provide a technical means for determining a progress stage of work in progress at a working place.

The following embodiments of the present disclosure provide a technical means for determining whether or not a risky situation or an accident has occurred in the working place.

The following embodiments of the present disclosure provide a technical means for preventing the occurrence of an event or accident by warning workers in advance about the event and accident that may occur in the working place.

In accordance with an exemplary embodiment of the present invention, there is provided a system for detecting an accident risk in a working place including a camera configured to photograph the working place, recognize an object by analyzing a photographed image, and transmit coordinates in the image of the recognized object and information about a type of the recognized object to a server, and a server configured to generate a virtual space that simulates the working place using a digital twin technique, receive the coordinates in the image of the recognized object and the information about the type of the recognized object from the camera, and place the recognized object in the virtual space, in which the server is configured to determine a work stage or whether or not a risky situation has occurred in the working place based on the number and position of the recognized objects.

Here, the server may be configured to place the recognized object in the virtual space using information about a position, direction, and angle of view of the camera in the working place.

In addition, the server may be configured to store at least one of information about a type of an object, information about the number of the objects, and information about a position of the object for each work stage of the working place, and compare the type of the recognized object, the number of the recognized objects, or the position of the recognized object in the virtual space with the stored information to determine the work stage of the working place.

In addition, the server may be configured to store at least one of information about a type of an object, information about the number of the objects, and information about a position of the object for each work stage of the working place, and determine that a risky situation has occurred in the working place when the type of the recognized object, the number of the recognized objects, or the position of the recognized object is different from the stored information.

Here, the server may be configured to transmit a warning message for the working place to the camera when determining that the risky situation has occurred in the working place, and the warning message may be displayed on the working place through the camera.

In accordance with another exemplary embodiment of the present invention, there is provided a camera installed in a working place including a photographing unit configured to photograph the working place, an object recognition unit configured to recognize an object in the photographed image by analyzing the image, and a transmitting unit configured to transmit coordinates in the image of the recognized object and information about a type of the recognized object to a server, in which the coordinates in the image of the recognized object and information about the type of the recognized object are used to place the recognized object in a virtual space that simulates the working place using a digital twin technique.

Here, the recognized object may be placed in the virtual space using information about a position, direction, and angle of view of the camera in the working place.

In addition, the type of the recognized object, the number of the recognized objects, or a position of the recognized object in the virtual space may be compared with at least one of information about a type of an object, information about the number of objects, and information about a position of the object stored in the server for each work stage of the working place in order to determine the work stage of the working place.

In addition, the type of the recognized object, the number of the recognized objects, or a position of the recognized object in the virtual space may be compared with at least one of information about a type of an object, information about the number of objects, and information about a position of the object stored in the server for each work stage of the working place in order to determine whether or not a risky situation has occurred in the working place.

Here, the camera may further include a receiving unit configured to receive a warning message for the working place when it is determined that the risky situation has occurred in the working place, and a message display unit configured to display the warning message.

In accordance with another exemplary embodiment of the present invention, there is provided a server including a virtual space generation unit configured to create a virtual space that simulates a working place using a digital twin technique, a receiving unit configured to receive coordinates in an image of an object recognized by analyzing the image, the image being obtained by photographing the working place, and information about a type of the recognized object, a position determination unit configured to place the recognized object in the virtual space with reference to the received coordinates in the image of the object and the received information about the type of the object, and a determination unit configured to determine a work stage of the working place or whether or not a risky situation has occurred in the working place based on the number and position of the recognized objects.

Here, the position determination unit may be configured to determine a position of the recognized object using information about a position, direction, and angle of view of the camera in the working place, and place the recognized object in the virtual space.

In addition, the server may be configured to further include a storage unit configured to store at least one of information about a type of an object, information about the number of the objects, and information about a position of the object for each work stage of the working place, and the determination unit may be configured to determine the work stage of the working place by comparing the type of the recognized object, the number of the recognized objects, or the position of the recognized object in the virtual space with the stored information.

In addition, the server may be configured to further include a storage unit configured to store at least one of information about a type of an object, information about the number of the objects, and information about a position of the object for each work stage of the working place, and the determination unit may be configured to determine whether or not the risky situation has occurred in the working place by comparing the type of the recognized object, the number of the recognized object, or the position of the recognized object with the stored information.

Here, the server may be configured to further include a transmitting unit configured to transmit a warning message for the working place to the camera when determining that the risky situation has occurred in the working place, and the warning message may be displayed on the working place through the camera.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
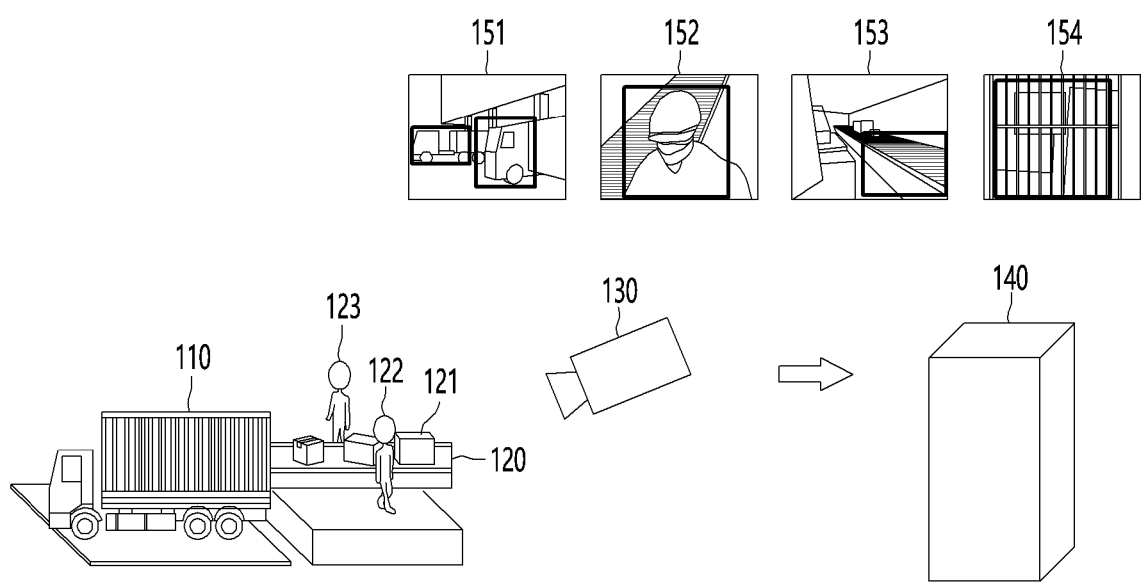
FIG. 1 is a diagram illustrating a concept of determining a work stage or determining whether or not an accident has occurred, based on an image obtained by photographing a working place.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the figures, the dimensions of layers and regions are exaggerated for clarity of illustration. Like reference numerals refer to like elements throughout. It will also be understood that when a layer, a film, a region or a plate is referred to as being 'on' another one, it can be directly on the other one, or one or more intervening layers, films, regions or plates may also be present. Further, it will be understood that when a layer, a film, a region or a plate is referred to as being 'under' another one, it can be directly under the other one, and one or more intervening layers, films, regions or plates may also be present. In addition, it will also be understood that when a layer, a film, a region or a plate is referred to as being 'between' two layers, films, regions or plates, it can be the only layer, film, region or plate between the two layers, films, regions or plates, or one or more intervening layers, films, regions or plates may also be present.

Hereinafter, embodiments will be described in detail with reference to the accompanying drawings.

FIG. 1 is a diagram illustrating a concept of determining a work stage or determining whether or not an accident has occurred based on an image obtained by photographing a working place.

In FIG. 1, as an example of the working place, a cargo loading and unloading workshop in which a truck 110 unloads a cargo 121 using a conveyor belt 120 is considered, but the present invention is not limited to the cargo loading and unloading workshop or cargo loading and unloading work illustrated in FIG. 1.

In FIG. 1, the truck 110 is unloading the cargo 121 through the conveyor belt 120, and workers 122 and 123 perform the work of unloading the cargo 121.

The cargo loading and unloading work is performed through various stages such as a stage in which the truck 110 approaches a work dock, a stage in which the truck 110 opens a door of a cargo compartment, a stage of extending the conveyor belt 120 into the cargo compartment, and a stage of unloading the cargo using the conveyor belt, depending on the work stages. In addition, for each stage, a distance between the truck 110 and the work dock, whether or not the door of the cargo compartment is opened, whether or not the conveyor belt 120 is extended, the positions of the workers 122 and 123, etc. are different.

A camera 130 according to an exemplary embodiment can photograph work performed at the working place, and recognize an object by analyzing the photographed image. The camera 130 can recognize the truck from a photographed image 151 or recognize the worker from a photographed image 152. In addition, the camera 130 can recognize the conveyor belt from a photographed image 153, and can recognize a cargo positioned inside and outside the cargo compartment from a photographed image 154.

Objects recognized by the camera are displayed as rectangular boxes, and four vertices of the rectangle or two vertices of the rectangle facing each other in the photographed image can be determined as coordinates of the corresponding object.

The camera can recognize a type of recognized object whether the object is the truck, the worker, or the conveyor belt. According to one aspect, the camera can use an artificial neural network trained using deep learning or machine learning techniques in order to determine the type of the recognized object.

The camera can transmit the coordinates in the image of the recognized object and information about the type of the recognized object to the server 140. Since the camera does not transmit the photographed image to the server 140 as it is, but only the coordinates of the object and information about the type of the object are transmitted to the server 140, and thus an amount of data transmitted to the server 140 can be minimized.

The server 140 creates a virtual space that simulates the working place using a digital twin technique. In addition, the server 140 receives the coordinates in the image of the recognized object and information about the type of the recognized object from the camera 130. Here, the coordinates of the object in the photographed image do not indicate a three-dimensional position of a thing in the working place corresponding to the object.

The server 140 places the recognized object in the virtual space based on the coordinates in the image of the recognized object and information about the type of the recognized object. The server 130 can determine the coordinates in the virtual space of the recognized object using information about the position, direction, and angle of view of the camera in the working place, and can place the recognized object at the determined coordinates.

The server 140 can determine the work stage of the working place based on the number and position of the recognized objects. For example, in the stage in which the truck 110 approaches the work dock, only the truck 110 is positioned around the work dock, and the workers 122 and 123 cannot be positioned. If, in the corresponding stage, the workers 122 and 123 are positioned at the bottom of the work dock, the server 140 can determine that an accident has occurred in the working place or that an accident is highly likely to occur, and can transmit an appropriate warning signal to the workers 122 and 123.

Figure 2:
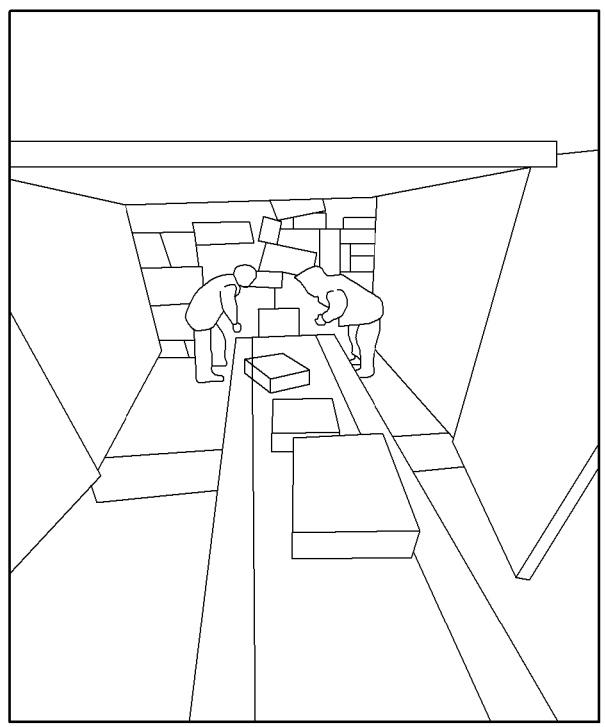
FIG. 2 is a diagram illustrating a concept of creating a virtual space that simulates the working place and placing an object recognized from the image obtained by photographing the working place in the virtual space.
Figure 2:
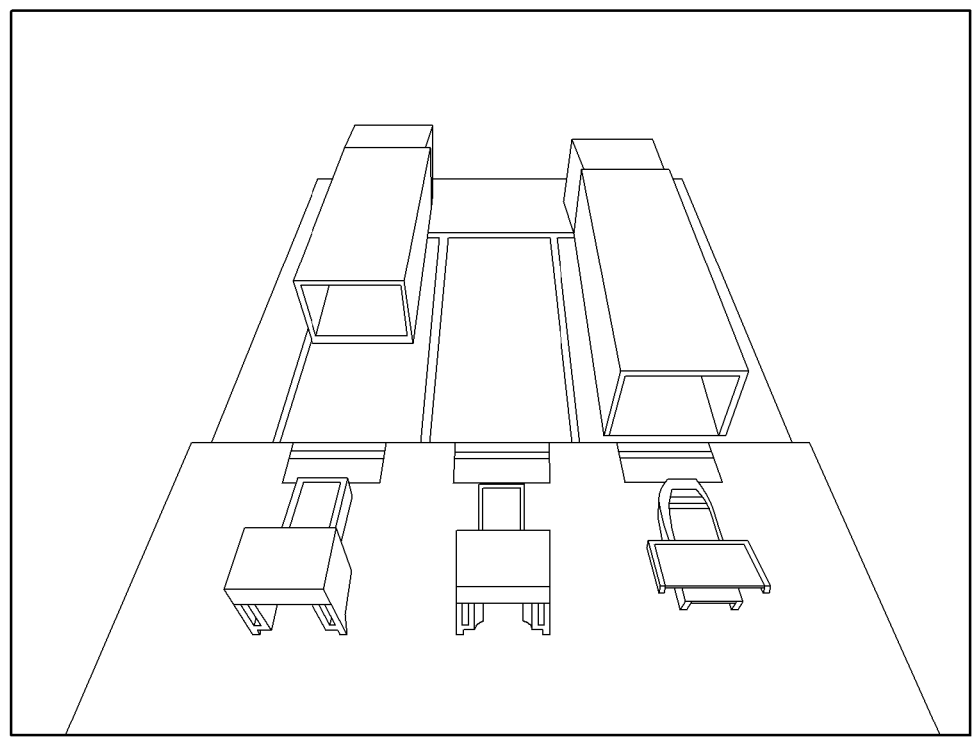

FIG. 2 is a diagram illustrating a concept of creating the virtual space that simulates the working place and placing an object recognized from an image obtained by photographing the working place in the virtual space.

FIG. 2(*a*) is a photograph of obtained by photographing the working place, and FIG. 2(*b*) is a diagram illustrating the virtual space obtained by that simulates the working place using the digital twin technique.

In the virtual space illustrated in FIG. 2(*b*), a truck, a work dock, a conveyor belt, etc. are placed, similarly to the working place. However, since the server according to the exemplary embodiment can determine the work stage or determine the possibility of an accident in consideration of the number, position, etc. of objects representing the truck, the worker, the conveyor belt, etc., the truck, the work dock, the conveyor belt, etc. can be modeled simply without modeling them to be similar to real things.

In FIG. 2(*b*), the truck is simply modeled as a rectangle without considering an actual shape of the truck, and the worker can be modeled as a vertical red pillar. Therefore, the server can allocate only a lower level of computational amount and memory in order to create and manage the virtual space obtained by that simulates the working place. As a result, server can manage more the virtual space that simulates the working place.

Figure 3:
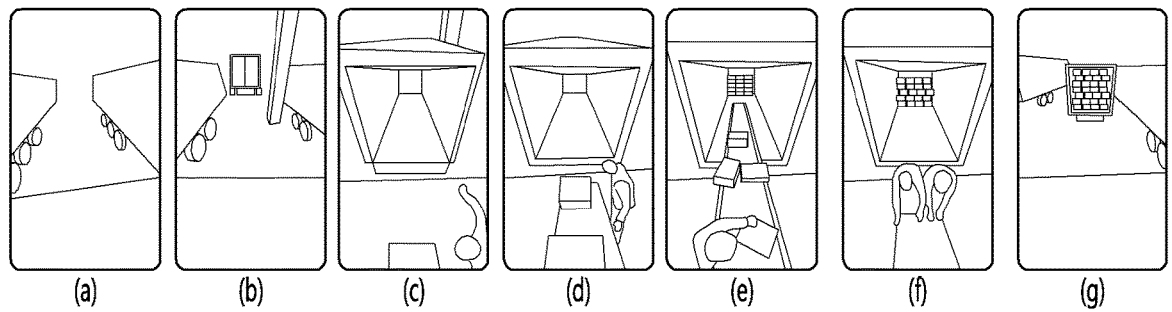
FIG. 3 is a diagram illustrating the classification of work stages performed in the working place.

FIG. 3 is a diagram illustrating the classification of work stages performed in the working place. In FIG. 3, the work stages are classified in consideration of an embodiment of performing courier loading and unloading work, but the work stages can be classified in a similar way in other embodiments targeting other working places.

FIG. 3(*a*) illustrates a state in which a vehicle has not yet approached the work dock, and it can be classified as a 'no vehicle' stage. According to one aspect, if the truck is not positioned in a space extending vertically from the work dock, the server can determine the work stage as 'no vehicle'.

FIG. 3(*b*) illustrates a state in which the vehicle is entering the work dock, and it can be classified as a 'vehicle entry' stage. According to one aspect, if the truck is positioned in the space extending vertically from the work dock and the truck is moving backward in the direction of the work dock, the server can determine the work stage as 'vehicle entry'.

FIG. 3(*c*) illustrates a state in which the vehicle enters the work dock and then the backward moving is completed and come alongside the work dock, and it can be classified as a 'coming-alongside completion' stage. According to one aspect, if the truck is stopped adjacent to the work dock, the server can determine the work stage as 'coming-alongside completion'.

FIG. 3(*d*) illustrates a state in which the door of the cargo compartment positioned at the rear of the truck is opened and the conveyor belt extends to the truck so that loading and unloading work is possible, and it can be classified as a 'work preparation' stage. According to one aspect, if the door of the cargo compartment is opened and the conveyor belt extends in the direction of the truck, the server can determine the work stage as a 'work preparation' stage.

FIG. 3(*e*) illustrates a state in which the work of transporting a cargo into the cargo compartment using the conveyor or transporting the cargo inside the cargo compartment to the outside of the cargo compartment is being performed, and it can be classified as a 'work start' stage. According to one aspect, if the cargo on the conveyor belt is moving, the server can determine the work stage as the 'work start' stage.

FIG. 3(*f*) illustrates a state in which the cargo loading and unloading work is completed and the workers are reducing the conveyor belt again, and it can be classified as a 'work completion' stage. According to one aspect, if the cargo does not move anymore and the length of the conveyor belt is being reduced, the server can determine the work stage as the 'work completion' stage.

FIG. 3(g) illustrates a state in which all the work is completed and the truck leaves the work dock, and it can be classified as a 'vehicle departure' phase. According to one aspect, if the truck is leaving the work dock and moving away therefrom, the server can determine the work stage as 'vehicle departure'.

Since the server can determine the work stage in consideration of the number, position, etc. of the objects representing the truck, the worker, the conveyor belt, etc., the truck, the work dock, the conveyor belt, etc. can be modeled simply without modeling them to be similar to real things.

Figure 4:
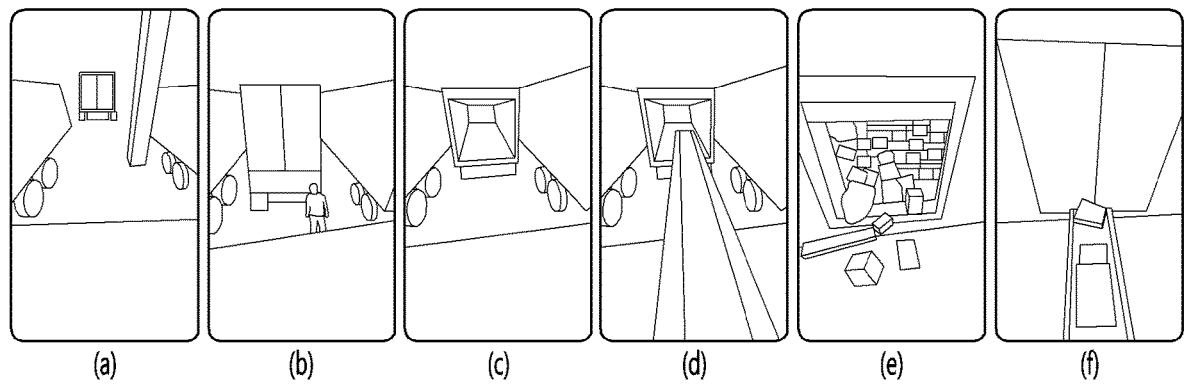
FIG. 4 is a diagram illustrating the risk of an accident that may occur for each work stage.

FIG. 4 is a diagram illustrating the risk of an accident that may occur for each work stage.

FIG. 4(a) illustrates a situation in which there is a risk that the worker and the truck can be collided with each other when the truck is moving backward. This situation may occur during the vehicle entry stage. When the worker is positioned on a moving line in which the truck is moving backward, the server can determine it as a situation in which there is a risk that the worker and the truck may be collided with each.

FIG. 4(b) illustrates a situation in which there is a risk that the worker may be caught between the truck and the work dock when the truck is moving backward. This situation may occur during the vehicle entry stage. When the truck is moving backward and the worker is positioned within a predetermined distance between the truck and the work dock, the server can determine it as a situation in which there is a risk that the worker may be caught between the truck and the work dock.

FIG. 4(c) illustrates a situation in which there is a risk that the worker who was working inside the working dock or cargo compartment may fall due to the movement of the truck during the loading and unloading work. This situation may occur during the work start stage and during the work completion stage. If the truck is moving during the work start stage and during the work completion stage, the server can determine it as a situation in which there is a risk that the worker may fall.

FIG. 4(d) illustrates a situation in which there is a risk of an accident due to the movement of the truck in a state in which the conveyor belt is extended into the cargo compartment for the loading and unloading work. This situation may occur during the work start stage and during the work completion stage. If the truck moves in the state in which the conveyor is extended inside the cargo compartment, the server can determine it as a situation in which there is a risk that the conveyor belt will be damaged.

FIG. 4(e) illustrates a situation in which there is a risk that a cargo box may collapse when the door of a cargo compartment is opened and the workers are injured. This situation may occur during the work preparation phase. When the door of the cargo compartment is opened in the work preparation stage, the server can determine it as a situation in which there is a risk that the workers may be injured. In accordance with another exemplary embodiment of the present invention, when the cargo boxes are suddenly detected on the floor in the work preparation stage, it can be determined that the box collapse has occurred and the workers may be injured.

FIG. 4(f) illustrates a situation in which there is a risk that the worker may be caught between the truck and the conveyor belt when the conveyor belt is extended. This situation may occur during the work preparation phase. When the conveyor belt is extended in the work stage, the server can determine it as a situation in which there is a risk that the worker may be caught between the truck and the conveyor belt.

Figure 5:
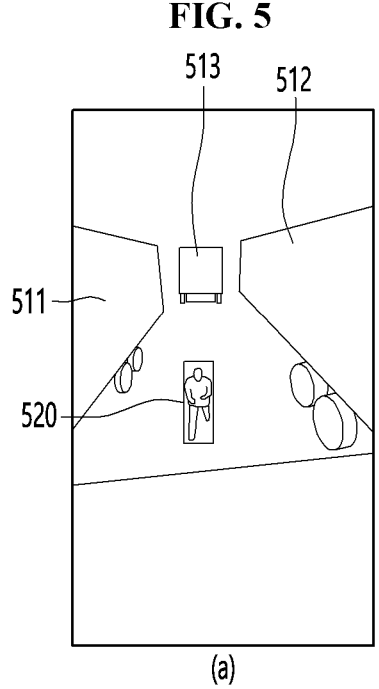
FIG. 5 is a diagram illustrating a concept of determining the work stage of the working place based on the image obtained by photographing the working place.
Figure 5:
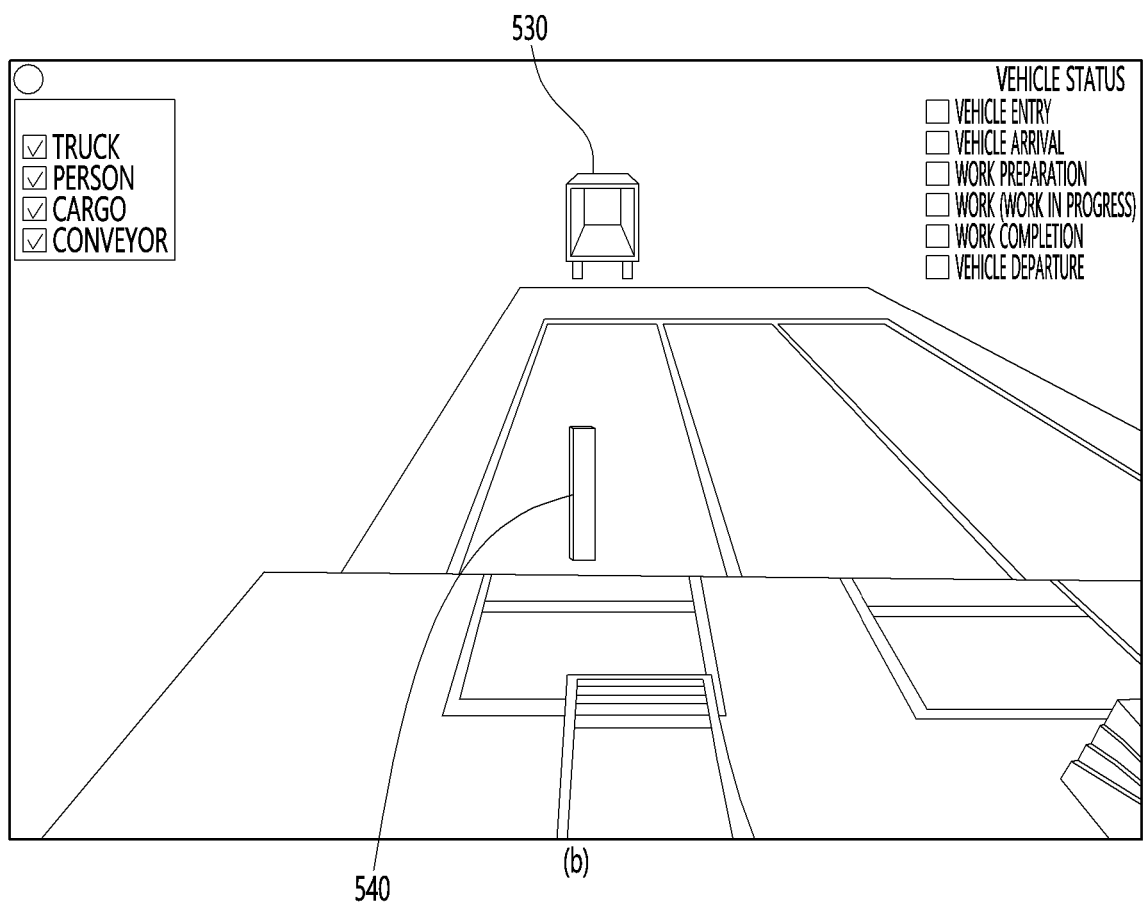

FIG. 5 is a diagram illustrating a concept of determining the work stage of the working place based on an image obtained by photographing the working place.

FIG. 5(a) is a photograph of the working place in a situation where there is a risk that the worker may be caught between the truck and the work dock when the truck is moving backward and FIG. 5(b) is a diagram illustrating a virtual space that simulates the working place.

The camera according to an exemplary embodiment can photograph the working place illustrated in FIG. 5(a) and recognize objects such as trucks 511, 512, and 513, a worker 520, etc. by analyzing the photographed photo.

The server according to an exemplary embodiment can receive the coordinates in the image of the recognized object and the information about the type of the recognized object from the camera, and place the recognized object in the virtual space with reference to the coordinates in the image of the recognized object and information about the type of the recognized object.

The server can inversely calculate the distance between the truck 513 and the worker 520 in the working place using the distance between the objects 530 and 540 placed in the virtual space. If the distance obtained by performing the inverse calculation is reduced within a predetermined distance, the server can determine it as a situation in which there is a risk that the worker may be caught between the truck and the work dock.

Figure 6:
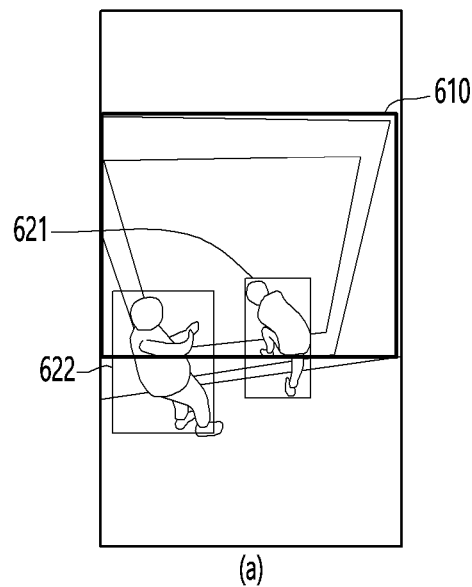
FIG. 6 is a diagram illustrating a concept of determining whether or not the accident has occurred in the working place or warning about the risk of an accident, based on the image obtained by photographing the working place.
Figure 6:
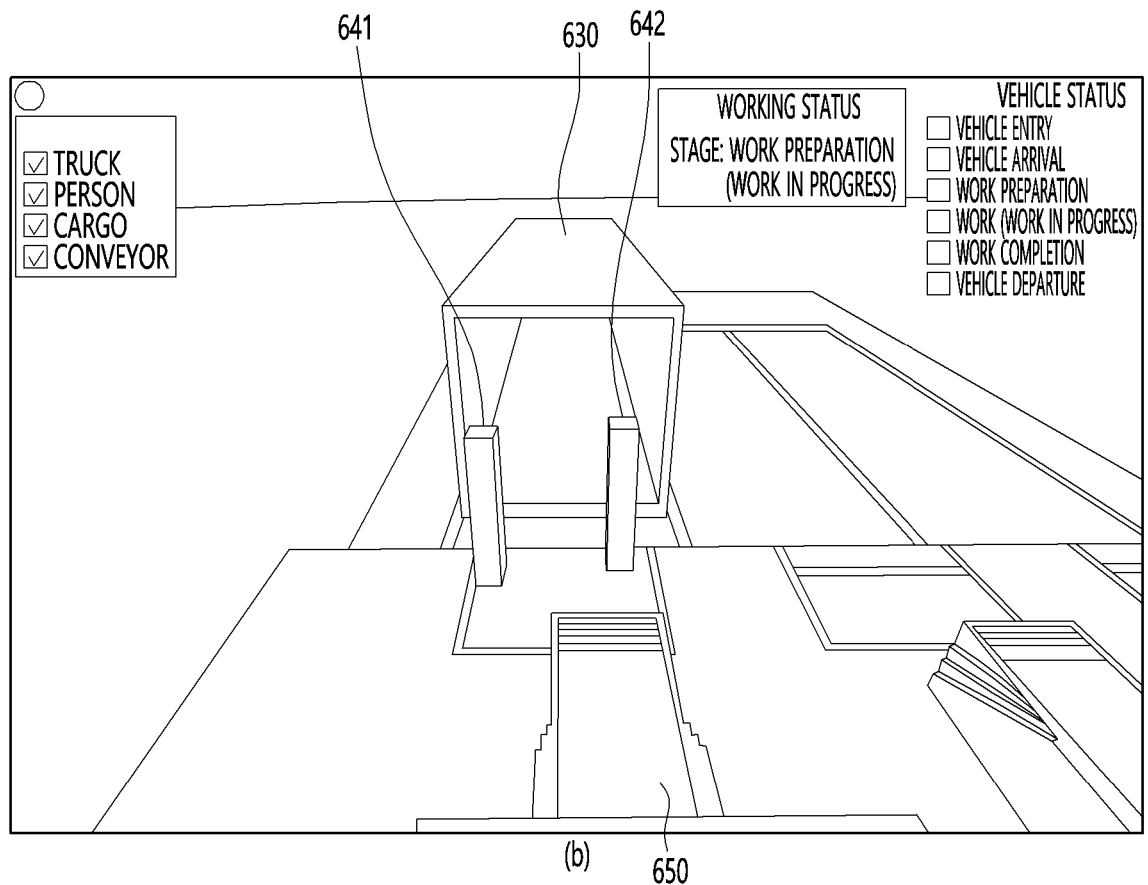

FIG. 6 is a diagram illustrating a concept of determining whether or not the accident has occurred in the working place based on the image obtained by photographing the working place, or warning about the risk of an accident.

FIG. 6(a) is a photo obtained by photographing the working place in a situation where there is a risk that the workers may be injured due to the collapse of the cargo box when the door of the cargo compartment is opened during the work preparation stage, and FIG. 6(b) is a diagram illustrating a virtual space that simulates the working place.

The camera according to an exemplary embodiment can photograph the working place in FIG. 6(a), and recognize objects such as a truck 610 and workers 621 and 622 by analyzing a photographed photo.

The server according to an exemplary embodiment can receive the coordinates in the image of the recognized object and the information about the type of the recognized object from the camera, and place the recognized object in the virtual space with reference to the coordinates in the image of the recognized object and information about the type of the recognized object.

When it is determined, by using the distance between objects 630, 641, 642, 650, etc. placed in the virtual space, that the workers 621 and 622 are positioned between the work dock and the truck 610 in the working place and the conveyor belt 650 is extended in the direction of the truck, the server can determine it as a situation in which an accident, in which the door of the cargo compartment is opened and the cargo box collapses, may occur.

Figure 7:
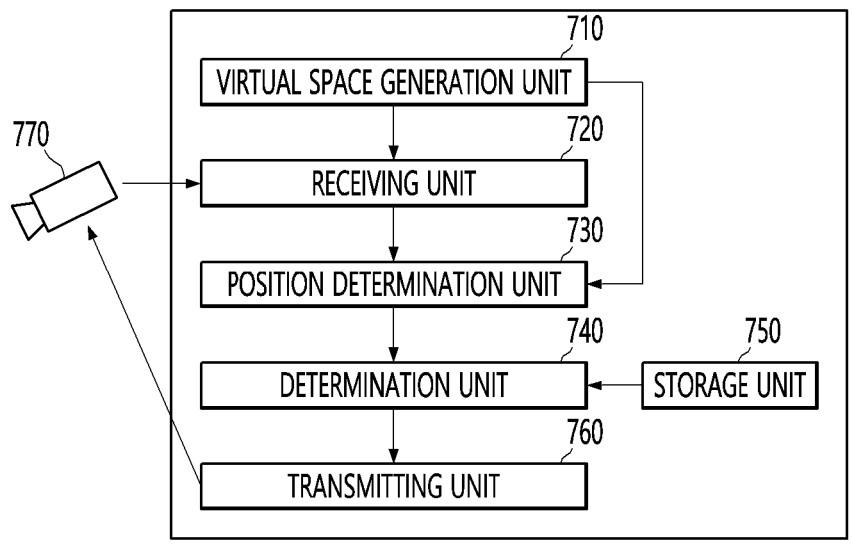
FIG. 7 is a block diagram illustrating a configuration of a server according to an exemplary embodiment.

FIG. 7 is a block diagram illustrating a configuration of the server according to an exemplary embodiment.

A server 700 according to an exemplary embodiment can include a virtual space generation unit 710, a receiving unit 720, a position determination unit 730, a determination unit 740, a storage unit 750, and a transmitting unit 760.

The virtual space creation unit 710 creates a virtual space that simulates a working place using the digital twin technique.

The receiving unit 720 receives the coordinates in the image of the recognized object and the information about the type of the recognized object by analyzing the image obtained by photographing the working place from a camera 770.

The position determination unit 730 places the recognized object in the virtual space with reference to the coordinates in the image of the received object and information about the type of the received object. According to one aspect, the position determination unit 730 can determine a position of the recognized object using information about the position, direction, and angle of view of the camera in the working place, and can place the recognized object in the virtual space.

The determination unit 740 can determine the work stage or determine whether or not a risky situation has occurred in the working place, based on the number and position of the recognized objects. According to one aspect, the server 700 can further include the storage unit 750 including at least one of information about the type of object, information about the number of objects, and information about the position of the object for each work stage of the working place. In this case, the determination unit 740 can compare the type of the recognized object, the number of recognized objects, or the position of the recognized object in virtual space with information stored in the storage unit 750 to determine the work stage of the working place or determine whether or not the risky situation has occurred in the working place.

When it is determined that the risky situation has occurred in the working place, the transmitting unit 760 transmits a warning message for the working place to the camera 770. The transmitted warning message can be displayed on the working place through the camera 770. For example, the camera 770 that has received the warning message can display the warning message on the working place by a method such as blinking a warning light or sending out a warning sound.

Figure 8:
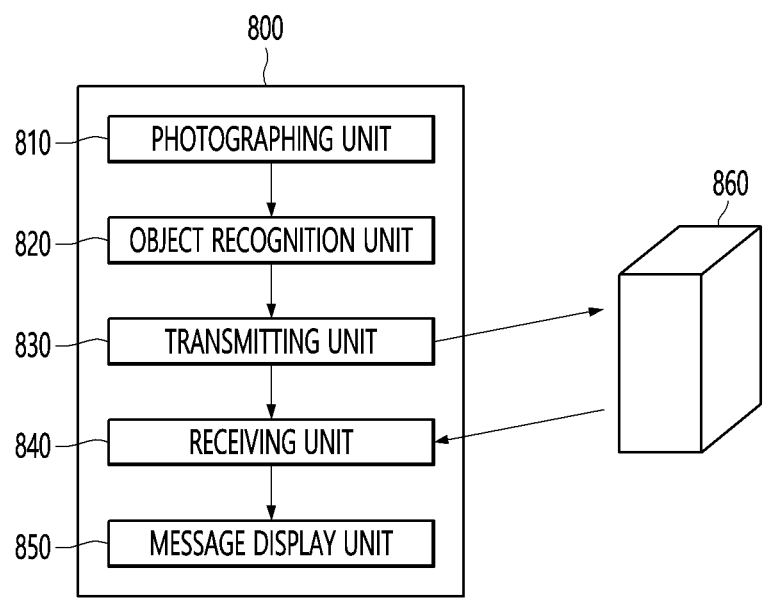
FIG. 8 is a block diagram illustrating a configuration of a camera according to an exemplary embodiment.

FIG. 8 is a block diagram illustrating a configuration of the camera according to an exemplary embodiment.

A camera 800 according to an exemplary embodiment can include a photographing unit 810, an object recognition unit 820, a transmitting unit 830, a receiving unit 840, and a message display unit 850.

The photographing unit 810 photographs the working place where the camera is installed.

The object recognition unit 820 recognizes an object in the image by analyzing the photographed image. According to one aspect, the object recognition unit 820 can recognize the object in the image using an artificial neural network trained in advance to recognize objects frequently appearing in the working place.

The recognized object is displayed as a rectangle, and the coordinates of four vertices of the rectangle or two vertices on a diagonal line facing each other may be referred to as coordinates of the corresponding object.

The transmitting unit 830 transmits the coordinates in the image of the recognized object and information about the type of the recognized object to the server. The coordinates in the image of the recognized and information about the type of the recognized object are used to place the recognized object in the virtual space that simulates the working place using the digital twin technique.

According to one aspect, the server can place the recognized object in the virtual space using information about the position, direction, and angle of view of the camera in the working place. That is, the object positioned at the center of the screen can be placed so as to be positioned on an extension line in a direction in which the camera is directed from the position of the camera. In addition, objects that are not positioned in the center of the screen can be placed at positions deviated by an angle proportional to the distance from the center of the screen, from the direction in which the camera is directed. The angle at which each of the objects deviates can be determined in consideration of the angle of view of the camera.

The type of recognized object and the number of recognized objects that are transmitted to the server 860, and the position in the virtual space of the object determined in the server can be used to determine the work stage of the working place or to determine whether or not a risky situation has occurred in the working place.

According to one aspect, the type of recognized object and the number of recognized objects that are transmitted to the server and the position in the virtual space of the object determined in the server are compared with at least one of information about the type of object, information about the number of objects, and information about the position of the object for each work stage of the working place stored in the server. According to the comparison result, the working stage of the working place can be determined, or whether or not the risky situation has occurred in the working place, etc. can be determined.

When it is determined that the risky situation has occurred in the working place, the receiving unit 840 receives a warning message for the working place.

The message display unit 850 displays the received warning message. According to one aspect, the message display unit 850 may be a warning light using an LED, etc. or a speaker. In this case, the message display unit 850 can display a warning message on the working place by a method such as blinking a warning light or sending out a warning sound.

The method according to the embodiment can be implemented in the form of program instructions that can be executed through various computer means and recorded in a computer-readable medium. The computer-readable medium can include program instructions, data files, data structures, etc. alone or in combination. The program instructions recorded on the medium may be specially designed and configured for the embodiment, or may be known and available to those skilled in the art of computer software. Examples of the computer-readable recording media include hardware devices specially configured to store and execute program instructions, such as magnetic media, such as hard disks, floppy disks and magnetic tapes, optical media, such as CD-ROMs and DVDs, magneto-optical media, such as floptical disks, a ROM, a RAM, a flash memory, etc. Examples of the program instructions include not only machine language codes such as those generated by a compiler, but also high-level language codes that can be executed by a computer using an interpreter or the like. The hardware devices described above can be configured to operate as one or more software modules to perform the operations of the embodiments, and vice versa.

As described above, although the embodiments have been described with reference to the limited embodiments and drawings, various modifications and variations can be made thereto from the above description by those of ordinary skill in the art. For example, even if the techniques described are performed in an order different from the method described, and/or the components of the described system, structure, device, circuit, etc. are coupled or combined in a form different from the described method, or replaced or substituted by other components or equivalents, appropriate results can be achieved.

Therefore, other implementations, other embodiments, and equivalents to the claims are also within the scope of the following claims.

According to the following embodiments, it is possible to determine the progress stage of work in progress in the working place.

According to the following embodiments, it is possible to determine whether or not a risky situation or an accident has occurred in the working place.

According to the following embodiments, it is possible to prevent the occurrence of an event or accident by warning workers in advance about the event or accident that may occur in the working place.

Although the system for detecting an accident risk in a working place has been described with reference to the specific embodiments, it is not limited thereto. Therefore, it will be readily understood by those skilled in the art that various modifications and changes can be made thereto without departing from the spirit and scope of the present invention defined by the appended claims.

What is claimed is:

1. A system for detecting an accident risk in a working place, comprising:
    a camera configured to photograph the working place, recognize an object by analyzing a photographed image, and transmit coordinates in the image of the recognized object and information about a type of the recognized object to a server; and
    a server configured to generate a virtual space that simulates the working place using a digital twin technique, receive the coordinates in the image of the recognized object and the information about the type of the recognized object from the camera, and place the recognized object in the virtual space,
    wherein the server is configured to place the recognized object in the virtual space by placing, in the virtual space, a simplified figure corresponding to the recognized object determined based on the type of the recognized object, and
    wherein the server is configured to determine a work stage or whether or not a risky situation has occurred in the working place based on the number and position of the recognized objects.

2. The system of claim 1, wherein the server is configured to place the recognized object in the virtual space using information about a position, direction, and angle of view of the camera in the working place.

3. The system of claim 1, wherein the server is configured to store at least one of information about a type of an object, information about the number of the objects, and information about a position of the object for each work stage of the working place, and compare the type of the recognized object, the number of the recognized objects, or the position of the recognized object in the virtual space with the stored information to determine the work stage of the working place.

4. The system of claim 1, wherein the server is configured to store at least one of information about a type of an object, information about the number of the objects, and information about a position of the object for each work stage of the working place, and determine that a risky situation has occurred in the working place when the type of the recognized object or the number of the recognized objects is different from the stored information.

5. The system of claim 4, wherein the server is configured to transmit a warning message for the working place to the camera when determining that the risky situation has occurred in the working place, and the warning message is displayed on the working place through the camera.

6. The system of claim 1, wherein, in response that the type of the recognized object is a worker in the working place, the simplified figure corresponding to the recognized object is determined as a vertical pillar-shaped figure.

7. A camera installed in a working place, comprising:
    a photographing unit configured to photograph the working place;
    an object recognition unit configured to recognize an object in the photographed image by analyzing the image; and
    a transmitting unit configured to transmit coordinates in the image of the recognized object and information about a type of the recognized object to a server,
    wherein the coordinates in the image of the recognized object and information about the type of the recognized object are used to place the recognized object in a virtual space that simulates the working place using a digital twin technique, and
    wherein the recognized object is placed by the server in the virtual space by placing, in the virtual space, a simplified figure corresponding to the recognized object determined based on the type of the recognized object.

8. The camera of claim 7, wherein the recognized object is placed in the virtual space using information about a position, direction, and angle of view of the camera in the working place.

9. The camera of claim 7, wherein the type of the recognized object, the number of the recognized objects, or a position of the recognized object in the virtual space is compared with at least one of information about a type of an object, information about the number of objects, and information about a position of the object stored in the server for each work stage of the working place in order to determine the work stage of the working place.

10. The camera of claim 7, wherein the type of the recognized object or the number of the recognized objects is compared with at least one of information about a type of an object, information about the number of objects, and information about a position of the object stored in the server for each work stage of the working place in order to determine whether or not a risky situation has occurred in the working place.

11. The camera of claim 10, further comprising:
    a receiving unit configured to receive a warning message for the working place when it is determined that the risky situation has occurred in the working place; and
    a message display unit configured to display the warning message.

12. A server comprising:
    a virtual space generation unit configured to create a virtual space that simulates a working place using a digital twin technique;
    a receiving unit configured to receive coordinates in an image of an object recognized by analyzing the image, the image being obtained by photographing the working place, and information about a type of the recognized object;
    a position determination unit configured to place the recognized object in the virtual space with reference to the received coordinates in the image of the object and the received information about the type of the object; and a determination unit configured to determine a work stage of the working place or whether or not a risky situation has occurred in the working place based on the number and position of the recognized objects, wherein the position determination unit is configured to place the recognized object in the virtual space by placing, in the virtual space, a simplified figure corresponding to the recognized object determined based on the type of the recognized object.

13. The server of claim 12, wherein the position determination unit is configured to determine a position of the recognized object using information about a position, direction, and angle of view of the camera in the working place, and place the recognized object in the virtual space.

14. The server of claim 12, further comprising:
a storage unit configured to store at least one of information about a type of an object, information about the number of the objects, and information about a position of the object for each work stage of the working place, wherein the determination unit is configured to determine the work stage of the working place by comparing the type of the recognized object, the number of the recognized objects, or the position of the recognized object in the virtual space with the stored information.

15. The server of claim 12, further comprising:
a storage unit configured to store at least one of information about a type of an object, information about the number of the objects, and information about a position of the object for each work stage of the working place, wherein the determination unit is configured to determine whether or not the risky situation has occurred in the working place by comparing the type of the recognized object or the number of the recognized object.

16. The server of claim 15, further comprising:
a transmitting unit configured to transmit a warning message for the working place to the camera when determining that the risky situation has occurred in the working place,
wherein the warning message is displayed on the working place through the camera.

17. The server of claim 12, wherein, in response that the type of the recognized object is a worker in the working place, the simplified figure corresponding to the recognized object is determined as a vertical pillar-shaped figure.

* * * * *